US012716530B2

(12) United States Patent
Bissett

(10) Patent No.: US 12,716,530 B2
(45) Date of Patent: Aug. 25, 2026

(54) DIELECTRIC RING GASKETS AND RELATED METHODS AND ASSEMBLIES FOR DETECTING INTERNAL CURRENT TRANSFER IN A PIPELINE

(71) Applicant: Focus Corrosion Inc., Fort St. John (CA)

(72) Inventor: Mark Bissett, Edmonton (CA)

(73) Assignee: FOCUS CORROSION INC., Edmonton (CA)

( * ) Notice: Subject to any disclaimer, the term of this patent is extended or adjusted under 35 U.S.C. 154(b) by 0 days.

(21) Appl. No.: 18/738,859

(22) Filed: Jun. 10, 2024

(65) Prior Publication Data

US 2024/0426407 A1 Dec. 26, 2024

(30) Foreign Application Priority Data

Jun. 20, 2023 (CA) ................................ CA 3204076

(51) Int. Cl.
*F16L 23/00* (2006.01)
*F16L 23/18* (2006.01)

(52) U.S. Cl.
CPC ............ *F16L 23/006* (2013.01); *F16L 23/18* (2013.01); *F16L 2201/20* (2013.01)

(58) Field of Classification Search
CPC ........ G01N 27/04; G01N 27/041; F16J 15/02; F16J 15/06; F16L 2201/20; F16L 25/02; F16L 25/026; F16L 23/003; F16L 23/006; F16L 23/18; F16L 23/22
See application file for complete search history.

(56) References Cited

U.S. PATENT DOCUMENTS

| | | | | |
|---|---|---|---|---|
| 3,561,793 | A | 2/1971 | Rode | |
| 4,406,467 | A | 9/1983 | Burger | |
| 4,776,600 | A | 10/1988 | Kohn | |
| 5,427,386 | A | 6/1995 | Breaker | |
| 6,402,159 | B1 | 6/2002 | Kohn | |
| 8,678,398 | B2 | 3/2014 | Anderson | |
| 2019/0093830 | A1 * | 3/2019 | Hughes ................ | G01N 27/041 |
| 2024/0151562 | A1 * | 5/2024 | Al-Janabi .............. | G01D 21/02 |

OTHER PUBLICATIONS

Miller Insulation Checker, Operating Instructions, last updated, Jul. 9, 2019, 3 pages.
Tahwa Kalpa Seal, Flange Insulation, obtained Apr. 16, 2022, 2 pages.
Miller Insulation Checker, published 2022, 3 pages.
Mahmoud Elmahdy, Troubleshooting Cathodic Protection Systems and Function Systems, last updated Feb. 8, 2021, 20 pages.
GPT, VCS Flange Isolation System, High-Reliability Flange Seal for Electrical Isolation and Sealing in Very Critical Service, Obtained Mar. 2, 2022, 4 pages.

* cited by examiner

*Primary Examiner* — Aaron M Dunwoody
(74) *Attorney, Agent, or Firm* — Robert A. Nissen

(57) ABSTRACT

An electrical insulating flange gasket has an electrode on the internal diameter of the gasket, and a test point on the external diameter of the gasket, for the purpose of measuring internal current transfer.

27 Claims, 4 Drawing Sheets ion+
12
18
24
54
138
150
62
25
148
52
123
110
160
42
40
16
44
130
132
60
38
36
260
280
164
28
46
48
34
10
22
166
26

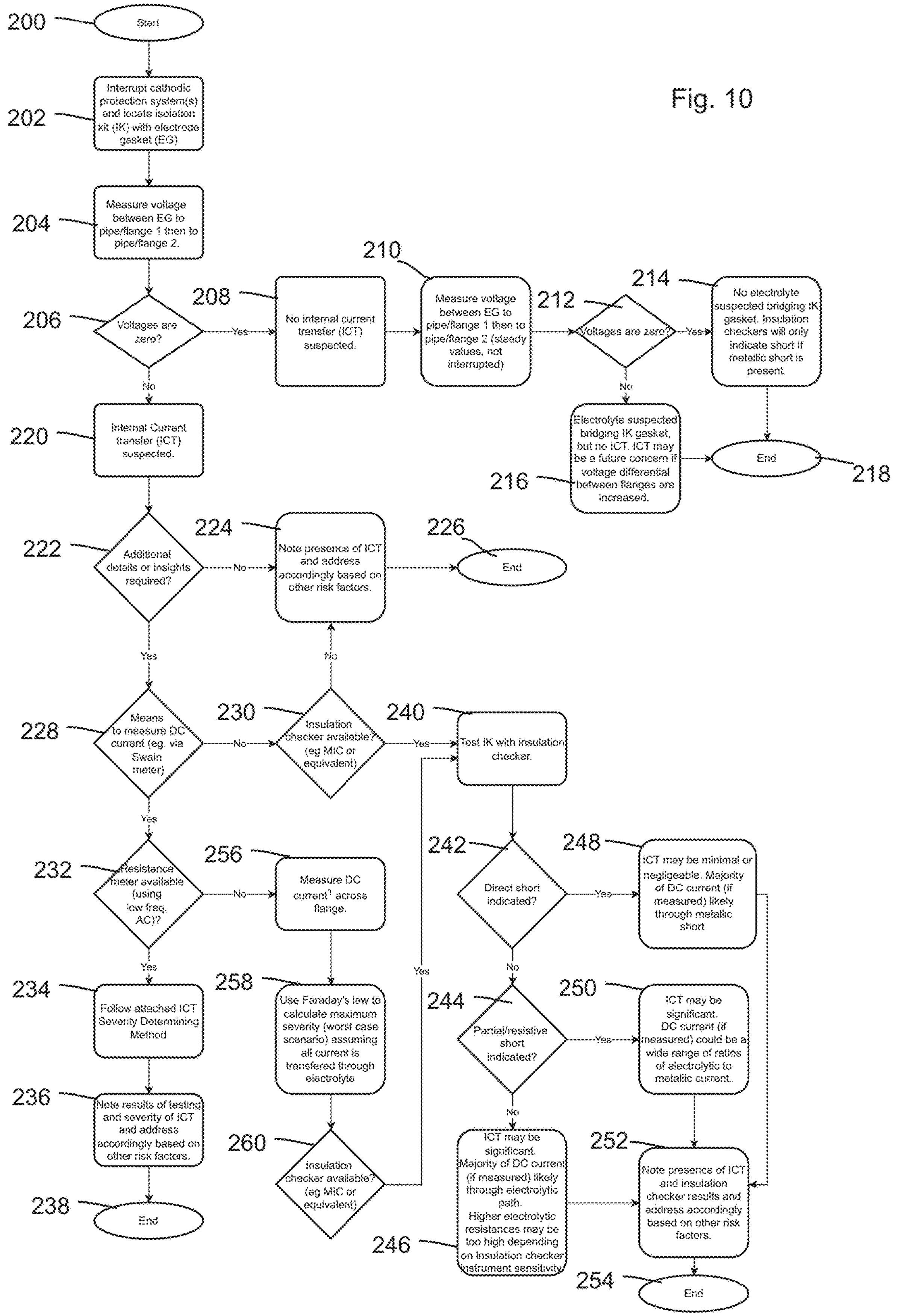

Fig. 10
200
Start
202
Interrupt cathodic protection system(s) and locate isolation kit (IK) with electrode gasket (EG)
204
Measure voltage between EG to pipe/flange 1 then to pipe/flange 2.
206
Voltages are zero?
Yes
208
No internal current transfer (ICT) suspected.
210
Measure voltage between EG to pipe/flange 1 then to pipe/flange 2 (steady values, not interrupted)
212
Voltages are zero?
Yes
214
No electrolyte suspected bridging IK gasket. Insulation checkers will only indicate short if metallic short is present.
No
216
Electrolyte suspected bridging IK gasket, but no ICT. ICT may be a future concern if voltage differential between flanges are increased.
218
End
No
220
Internal Current transfer (ICT) suspected.
222
Additional details or insights required?
No
224
Note presence of ICT and address accordingly based on other risk factors.
226
End
Yes
No
228
Means to measure DC current (eg. via Swain meter)
No
230
Insulation checker available? (eg MIC or equivalent)
Yes
240
Test IK with insulation checker.
Yes
232
Resistance meter available (using low freq. AC)?
No
256
Measure DC current¹ across flange.
242
Direct short indicated?
Yes
248
ICT may be minimal or negligeable. Majority of DC current (if measured) likely through metallic short
Yes
234
Follow attached ICT Severity Determining Method
258
Use Faraday's law to calculate maximum severity (worst case scenario) assuming all current is transfered through electrolyte
Yes
No
244
Partial/resistive short indicated?
Yes
250
ICT may be significant. DC current (if measured) could be a wide range of ratios of electrolytic to metallic current.
236
Note results of testing and severity of ICT and address accordingly based on other risk factors.
260
Insulation checker available? (eg MIC or equivalent)
No
246
ICT may be significant. Majority of DC current (if measured) likely through electrolytic path. Higher electrolytic resistances may be too high depending on insulation checker instrument sensitivity
252
Note presence of ICT and insulation checker results and address accordingly based on other risk factors.
238
End
254
End

DIELECTRIC RING GASKETS AND RELATED METHODS AND ASSEMBLIES FOR DETECTING INTERNAL CURRENT TRANSFER IN A PIPELINE

TECHNICAL FIELD

This document relates to dielectric ring gaskets, and related methods and assemblies for detecting internal current transfer in a pipeline.

BACKGROUND

The following paragraphs are not an admission that anything discussed in them is prior art or part of the knowledge of persons skilled in the art.

Swain™ current meters and isolation kit testers are used in tandem to make inferences on whether internal corrosion is occurring within a pipeline at a joint in the pipeline, however, false positive readings are possible.

SUMMARY

A pipeline joint assembly is disclosed comprising: first and second pipe fittings each formed with a pipe body and a ring flange, with the ring flanges aligned, electrically isolated from one another, and mated via fasteners extended between aligned aperture arrays in the ring flanges; a dielectric ring gasket between the ring flanges and having: first and second dielectric ring portions; and an electrode isolated between the first and second dielectric ring portions and extended from an inner circumferential edge and an outer circumferential edge of the dielectric ring gasket; and an electrical characteristic sensor connected to the electrode.

A method is disclosed comprising measuring an electrical characteristic between a side of a joint assembly in a pipeline and an electrode isolated within a dielectric ring gasket that is between mated ring flanges of the joint assembly.

A dielectric ring gasket is disclosed for a pipeline joint assembly comprising: first and second dielectric ring portions, integrally or non-integrally connected together to define opposed dielectric pipeline flange-contacting faces, an inner circumferential edge, and an outer circumferential edge; and an electrode isolated between the first and second dielectric ring portions and extended between the inner circumferential edge and the outer circumferential edge of the dielectric ring gasket.

An electrical insulating flange gasket is disclosed with an electrode on the internal diameter of the gasket, and a test point on the external diameter of the gasket, for the purpose of measuring internal current transfer.

Some of the disclosed methods may be used to determine:

a. whether there is an electrolyte bridging the flange faces b. whether current is travelling from one flange to the other through the electrolyte.

Some methods may not be used to determine the quantity or severity of the ICT; however, such may be used to determine whether ICT exists.

A thin metal electrode may be placed within an insulating gasket, along the inner diameter of the gasket, accessible from outside the flange through either a conducting wire or metallic disc-such may allow an internal measurement to be taken from the outside of the pipe. The disclosed methods and gaskets may eliminate or reduce the number of falsely identified flanges with ICT that only have current bypassing the insulating kit due to a resistive metallic short, by confirming the presence of an electrolyte and current pickup/discharge from within the pipe.

In various embodiments, there may be included any one or more of the following features: The first and second dielectric ring portions comprise first and second dielectric discs that are connected together. The electrode comprises a conductive disc between the first and second dielectric discs. The electrode comprises an elongate member. The elongate member extends radially through the dielectric ring gasket. The elongate member comprises a wire. The elongate member defines a conductor termination point on the outer circumferential edge of the dielectric ring gasket. The electrode extends circumferentially around the inner circumferential edge of the dielectric ring gasket. Each fastener is inserted within a dielectric fastener liner to electrically isolate the adjacent ring flanges. The electrode comprises a plurality of electrodes. The electrical characteristic sensor is connected to one of the first and second pipe fittings. The electrical characteristic sensor comprises an electrical potential sensor. The electrical characteristic sensor comprises an electrical resistance sensor. The electrical characteristic sensor is a volt meter. A cathodic protection system in electrical connection with one of the first and second pipe fittings. A cathodic protection system is connected to a first side of the joint assembly in the pipeline; and the electrical characteristic is measured between a second side of the joint assembly and the electrode. Measuring is done while interrupting a power supply of the cathodic protection system. Using a voltmeter to measure the electrical characteristic. Measuring an electrical characteristic across the first side and a second side of the joint assembly using an insulation tester. Based on the measurements, determining whether there is a resistive metallic short across the first and second sides of the joint assembly, on conditions that there is an electrical potential measured between the first and second sides of the joint assembly and there is none or a steady or sporadic electrical potential measured between the second side and the electrode. Based on the measurements, determining whether there is electrolyte present in the pipeline but none or nominal internal corrosion of the second side, on conditions that there is no electrical potential measured between the first and second sides of the joint assembly and there is a steady or sporadic electrical potential measured between the second side and the electrode. Based on the measurements, determining whether there is internal corrosion occurring on the second side of the pipeline, on conditions that there is a shifting electrical potential measured between the second side and the electrode. Based on the measurements, determining whether there is solely a resistive metallic short across the first and second sides of the joint assembly, on conditions that there is decreased electrical resistance measured between the first and second sides of the joint assembly and there is no shifting or non-shifting electrical potential measured between the second side and the electrode. Based on the measurements, determining whether there is electrolyte present in the pipeline but none or nominal internal corrosion of the second side, on conditions that there is no shifting electrical potential measured between the second side of the pipeline and the electrode but there is a non-zero, steady (non-shifting) electrical potential measured between the second side and the electrode. Based on the measurements, determining whether there is internal corrosion occurring on the second side of the pipeline, on conditions that there is a shifting electrical potential measured between the second side and the electrode. Determining a rate of mass loss of internal corrosion occurring on the second side of the pipeline. Outputting the determined value on a display.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which:

FIG. 10 is a flow chart of a method of assessing and measuring internal corrosion of a pipeline.

DETAILED DESCRIPTION

Figure 1:
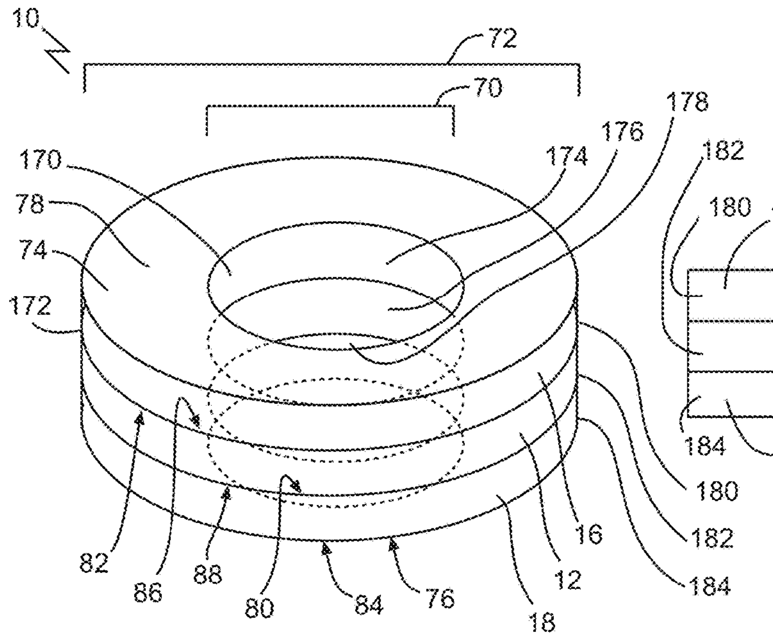
FIG. 1 is a perspective view of a dielectric ring gasket having an electrode disc or ring positioned between two dielectric ring portions.

Immaterial modifications may be made to the embodiments described here without departing from what is covered by the claims.

Pipeline systems may be constructed by joining together a plurality of pieces or sections to form a continuous fluid communication pathway. In a pipeline system, it is well-known to use seals at the interfaces between joined pieces (pipeline joints) to prevent leakage of the fluid at the joint. Commonly these seals are in the form of gaskets interposed between the joined pieces at their interface with the gaskets carrying compressible seal rings. In some instances, the gasket may be referred to as an isolation gasket, which when used as part of a kit or assembly to isolate the opposed flanges of the pipe joint, may serve to electrically isolate adjacent pieces of the pipeline.

A pipeline joint may have various components, materials, and associated parts. Piping components may be bolted together between flanges. Flanges may be used to connect pipe joints with each other, to valves, to fittings, and to other specialty items such as strainers and pressure vessels. Pipe joints may be manufactured using different materials and grades. The most common materials for pipe joint manufacturing include carbon steel, high yield carbon steel, alloy steel, stainless steel, and various nickel alloy grades. The different materials have different features which may modify the characteristics of the material, such as chemical resistance, toughness, corrosion resistance, pressure resistance, and heat resistance.

Installation, construction, operation and maintenance of pipelines may be carried out to minimize costs and losses. A common issue that arises in a pipeline is a leak at the joint between adjacent pipe sections. Pipelines are often stretched across remote areas of poor accessibility, and may sometimes be buried or otherwise difficult to access, making leaks difficult and expensive to detect and repair. Various causes of pipe joint failure arise from either the failure of the gasket or corrosion of the pipe flange or pipe body. To minimize repairs and use of resources, a well-designed pipe flange may be adapted to the pipeline system to prevent leaks and to protect the pipe flanges from corrosion caused by ground electric currents, galvanic electric currents flowing across the pipe flange joints, or other causes.

Pipeline corrosion is a common problem encountered in the pipeline industry. Pipeline corrosion refers to the deterioration of pipe material, whether internal or external. Corrosion may affect the pipeline itself, including parts of the pipeline that are made of both metals and non-metals. The most common type of corrosion is electrochemical corrosion. Corrosion may occur over time to the external surface of the pipeline when a pipeline made up of metal tubular structures that are at different surface potentials, causing current flow therebetween. Differences in surface potential may be created by several factors, such as varying metal composition or surface condition between sections, corrodible metal tubular structures crossing different electrolytic environments when electrically connected, or metal tubular structures picking up stray or induced electrical currents that are later discharged into the soil or water around the tubular structures. A similar form of corrosion may occur inside the pipe if the fluid in the pipe contains an electrolyte. External corrosion is typically controlled by cathodic protection, electrical isolating flanges, protective coatings or wrappings.

Cathodic protection (CP) may refer to a process where the electrical circuit, which otherwise would form to corrode a pipe, is disrupted with electrical isolating flanges and by cathodic protection, or protective coatings or wrappings, or both. Cathodic protection is a technique that may be used to control the corrosion of a metal surface by making it the cathode of an electrochemical cell. A simple method of cathodic protection connects the metal to be protected to a relatively more easily corroded sacrificial metal to act as the anode. Over time, the sacrificial metal then corrodes preferentially instead of the protected metal. For elongated structures such as long pipelines, where passive galvanic cathodic protection is inadequate, an external direct current (DC) electrical power source may be used to provide sufficient current. Various pipelines may also be protected by a coating supplemented with cathodic protection.

One example of a cathodic protection system is an impressed current cathodic protection system (ICCP). ICCP may incorporate a DC power source, an alternating current (AC) powered transformer rectifier and an anode, or array of anodes buried in the ground. The DC power source may have a DC output of up to 50 amperes and 50 volts, but this depends on several factors, such as the size of the pipeline and coating quality, and other values may be used greater or smaller. The positive DC output terminal may be connected via cables to the anode array, while another cable may connect the negative terminal of the rectifier to the pipeline, preferably through junction boxes to allow current measurements to be taken.

Internal current transfer (ICT) may cause corrosion of internal surfaces of a pipeline, particularly across joints of the pipeline. Stray voltage may occur when there is an electrical potential between two objects that ideally should not have any voltage difference. Relatively small voltages may exist between two grounded objects in separate locations, due to normal current flow in the system. Relatively large voltages may appear on the enclosures of electrical equipment due to a fault in the electrical power system, such as a failure of insulation. Due to the fault in the electrical insulation, and the application of cathodic protection on a target pipeline, voltage differences may exist across isolated flange faces of a pipeline joint. Potential differences within less conductive environment, such as those existing with petroleum and hydrophobic pipeline contents, may be formed when stray current flows through the pipe effectively creating a corrosion cell, due to the high electrical conductivity of buried steel pipelines. When an electrolyte is present in the pipeline, bridging the insulating gasket, a small corrosion cell may develop inside the pipe, actively corroding (usually) the 6 o'clock position (which may be the lowest portion of the pipeline in the case of a horizontal pipeline) of the more electro-positive flange, such as the side with no, or relatively less CP applied than the other side of the pipe joint. The current from the offending CP source may flow through the soil, with the current returning across the flange via the electrolyte. This is commonly referred to as either internal current transfer (ICT) or internal stray current. Stray current may cause corrosion, and may affect the service life and safe use of pipelines.

Corrosion testing methods may be carried out as part of the routine inspection of a pipeline system. Such testing methods may determine a potential source corrosion, but may not be able to differentiate whether the corrosion occurred due to a failure in a pipe joint, such as across bridged insulated bolt sleeves, or due to internal corrosion and stray current, which may be current carried by electrolyte present, or current pickup or discharge from the cathodic protection of the pipe.

An existing method for determining if stray current exists in a pipe system is by using a DC clamp, such as a current clamp, around the pipe and by interrupting the CP source that may be causing the stray current. A current clamp, also known as current probe, may be an electrical device with jaws that open to allow clamping around an electrical conductor for nondestructive testing thereof. Nondestructive testing (NDT) is any of a wide group of analysis techniques used in science and technology industry to evaluate the properties of a material, component or system without causing damage. The terms nondestructive examination (NDE), nondestructive inspection (NDI), and nondestructive evaluation (NDE) are also commonly used to describe this technology. A current clamp may measure current in a conductor without the need to make physical contact with it, or to disconnect it for insertion through the probe. Current clamps may be used to read the magnitude of alternating current (AC) or direct current (DC), depending on the type of clamp. The current from the CP source may be interrupted because a DC current meter may tend to drift and may be difficult to maintain a proper zero point. The change in the measured DC current caused by the interruption of the current supply may be used as reference, rather than the static measurement of the CP current. If no current is measured by interrupting the CP supply, it may be assumed that there is no stray current. On the other hand, when a current is measured, it may either indicate the presence of stray current or a defect on the pipeline seal systems, such as a short in a flange isolation kit.

A flange isolation kit may be used to electrically isolate adjacent sections of pipeline. A mechanical seal may be used in a pipeline between a pipe joint together to prevent leakage, contain pressure, or exclude contamination from different systems. A flange isolation kit may include a mechanical seal to physically adjoin one or more pipe flanges, and may be used to protect pipelines. A flange isolation kit may be used to prevent diversion of current from the CP used on the pipeline, for example to prevent such current from being lost to either non-critical structures, for example, a facility's grounding system or metallic piles, or to an adjacent pipeline, which may be owned by a third party. If there is no isolation kit, there may be virtually no risk or corrosion to assembly 160 other than from the general composition of fluid. The isolation kit establishes a voltage differential across the flanges, creating a discontinuity point, so that in a basic case where there is no cathodic protection down or upstream, the flanges will have virtually the same voltage, and thus low risk of differential. However, with cathodic protection, the flanges will be at a differential, encouraging corrosion. Foreign structure may wish to be isolated from pipeline corrosion protection, hence why a user may use an isolation kit.

A pipeline flange joint may incorporate a pair of flanges, formed by relatively wide and flat rings. The pair of rings may each define an array of axial bolt apertures therethrough, with the apertures distributed at different angular positions at the same radius and even spacings about the circumference of the flanges. Fasteners, such as bolts may be passed through the flanges to secure the two flanges together.

A flange isolation kit may be used to electrically isolate a pair of mating flanges in a pipe joint, and may be made up of one or more components including, but not limited to, flange gaskets, bolt washers, and sleeves. As above, a flange gasket may comprise a dielectric ring that is made to fit between two sections of pipe junctions that are flared (pipe flanges) to provide higher contact surface area. A bolt washer may be a thin plate, often with a hole, which may be used to distribute the load of a threaded fastener between the flanges, such as a bolt or nut. A sleeve, such as a bolt sleeve, may be made of insulative (dielectric) materials, which may provide current isolation between two pipe junctions, by isolating a metal bolt from both or one of the opposed flanges of the pipe joint. A sleeve used in an isolation kit may have various suitable features. The sleeves provided in an isolation kit may each extend between pairs of aligned apertures of the respective arrays of apertures in the ring flanges, and may each fit around a respective bolt or other fastener that secures the flanges together. A sleeve may be made of different materials, depending on purpose. For example, in a pipeline system, sleeves may be dielectric and may be made of non-conductive materials such as glass reinforced polymer, epoxy, phenolic and Nomex™ materials.

During installation, and sometimes during use, of a flange isolation kit, damage to the sleeves or one or more of them may occur, leading to the creation of a conductive pathway between flanges, and an unintended short of CP voltage across the flanges. Flange isolation kits are typically field-installed, which is a process that may be more prone to error than an installation method carried out in a controlled facility. During installation, such bolt sleeves may be damaged, for crushed, bent, mis-aligned, or punctured, for example due to shearing pressure or over-tightening of fasteners, or if the bolt holes do not line up properly and/or were forced into place regardless. As a result of a sleeve failure, some of the metal from the bolts may partially touch or come within arc-threshold distance of the metal flange gasket, causing a resistive metallic pathway through which current may flow through, potentially causing stray current within a pipeline system.

An electronic isolation kit tester may be used to check the integrity of an isolation kit used with a pipeline joint. One example of such is the MC Miller Insulation Checker™, to determine if an isolation kit has failed and may be causing corrosion within or a short across a pipe junction or joint. An isolation kit tester may use a high frequency voltage supply to maintain a relatively more local testing effect. An electronic isolation kit may have one or more probes, for example a first probe attached to one side of flange gasket of interest, and a second probe applied to the other side of the flange system. Upon initiation, the tester may compare the current flow on each side of the flange gasket. An indicator, such as an LED indicator, may inform the user qualitatively, quantitatively, or both, whether the flange gasket is a good insulator, or if a damage or failure is present within the flange system. However, as above, an isolation kit tester may not be able to discern between a resistive metallic short across a failed bolt sleeve, or via another a resistive electrolytic path.

Referring to FIGS. 1, 2, 6 and 9, a dielectric ring gasket 10 is illustrated for use in sealing and electrically isolating a pipeline joint assembly 160. The dielectric ring gasket 10 may have plural, for example first and second, dielectric ring portions 16, 18, and an electrode 12. The electrode 12 may be located between the first and second dielectric ring portions 16, 18. The electrode 12 may define an interface between the ring portions, for example where the portions 16, 18 are molded around the electrode to form an integral unit. The ring portions 16 and 18 may integrally or non-integrally connect together. As a whole, the gasket 10 may define one or more of opposed dielectric pipeline flange-contacting faces 74, 76, an inner circumferential edge 170, and an outer circumferential edge 172. The electrode 12 may extend from the inner circumferential edge 170 and the outer circumferential edge 172 of the dielectric ring gasket 10. In use, the electrode 12 may be in contact with pipeline fluids, forming a reference electrode that cooperates with sensor 40 measure potential.

Referring to FIGS. 1-4, 6, and 9, the gasket 10 may comprise dielectric material. A dielectric may be an electrical insulator, which may be polarized by an applied electric field. When a dielectric material is placed in an electric field, electric charges do not flow through the material as they do in an electrical conductor. Materials such as rubber, fluoroelastomers (such as Viton™), polytetrafluoroethylene, elastomers, nitrile rubber, or silicon, may be good electrical insulators suitable for use in a pipeline gasket 10 because they have high electrical resistivity and resistance to degradation from petroleum products. The dielectric ring portions 16, 18 may be made of dielectric (insulative) material, such as epoxy, polymeric material, plastic, phenolic, rubber, or other materials. Dielectric parts, such as the dielectric ring portions, may act as an insulating barrier in a pipe system. In use, the dielectric ring portions 16, 18 may electrically isolate the electrode 12 from the pipe joint fittings 60, 62 of the pipeline joint assembly 160, by fitting and preventing bridging metallic contact between the opposed flanges 52, 54 of a pipeline joint assembly 160.

Figures 5, 6, 7, 8:
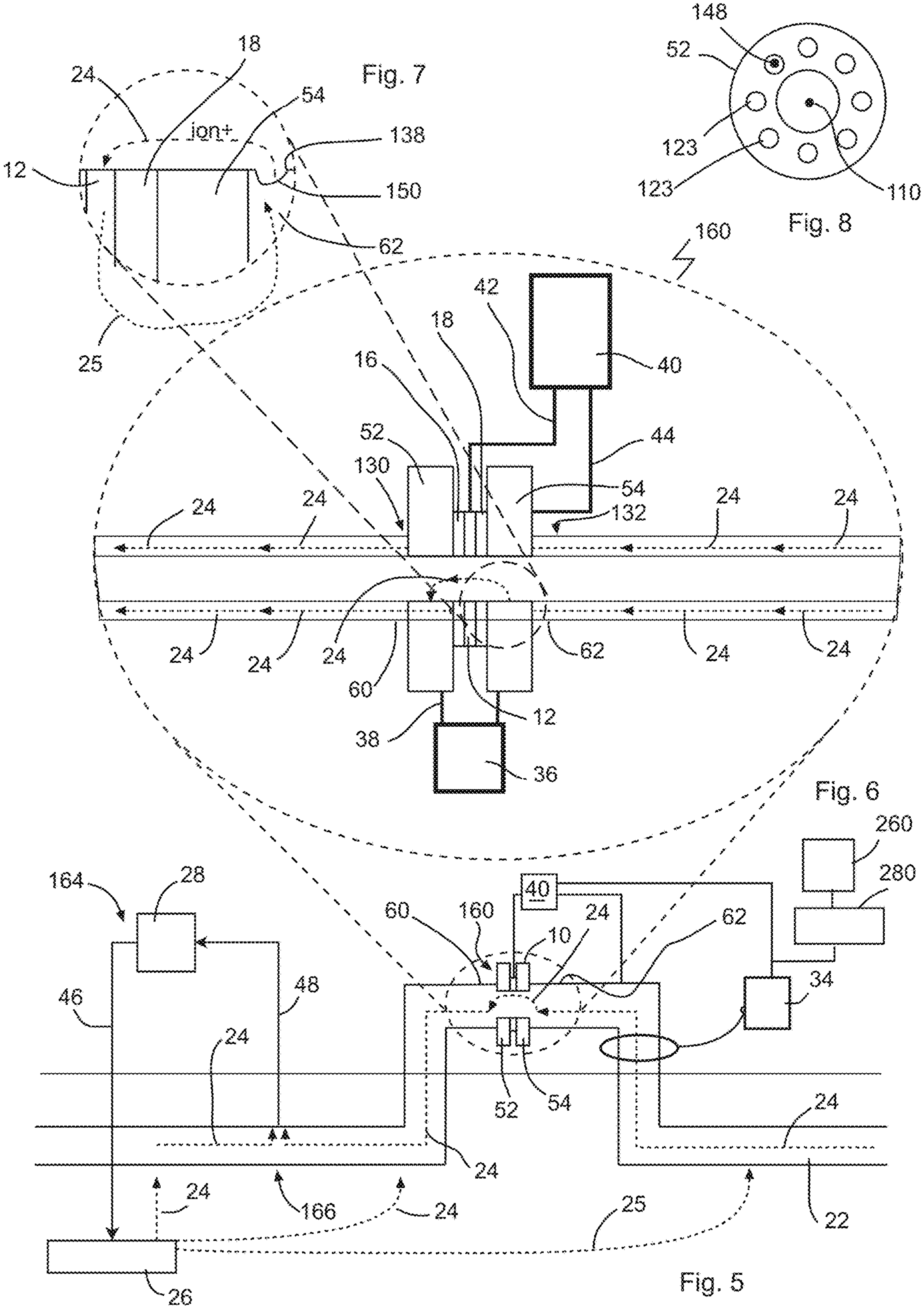
FIG. 5 is a schematic diagram of pipeline system incorporating a pipeline joint assembly, a cathodic protection system, and a Swain Current Meter.
FIG. 6 is a close-up more detailed view of the elliptical area denoted by dashed lines in FIG. 5, illustrating a cross-section of the pipeline joint assembly, which incorporates a dielectric ring gasket and an electrical characteristic sensor, as well as an insulation tester connected to opposed ring flanges.
FIG. 7 is a close-up view of the elliptical area denoted by dashed lines in FIG. 6, illustrating a corroded portion of s pipe joint of the pipeline joint of FIG. 6, with the corrosion having been caused by stray currents.
FIG. 8 is an end view of a ring flange and aperture array.
Figure 9:
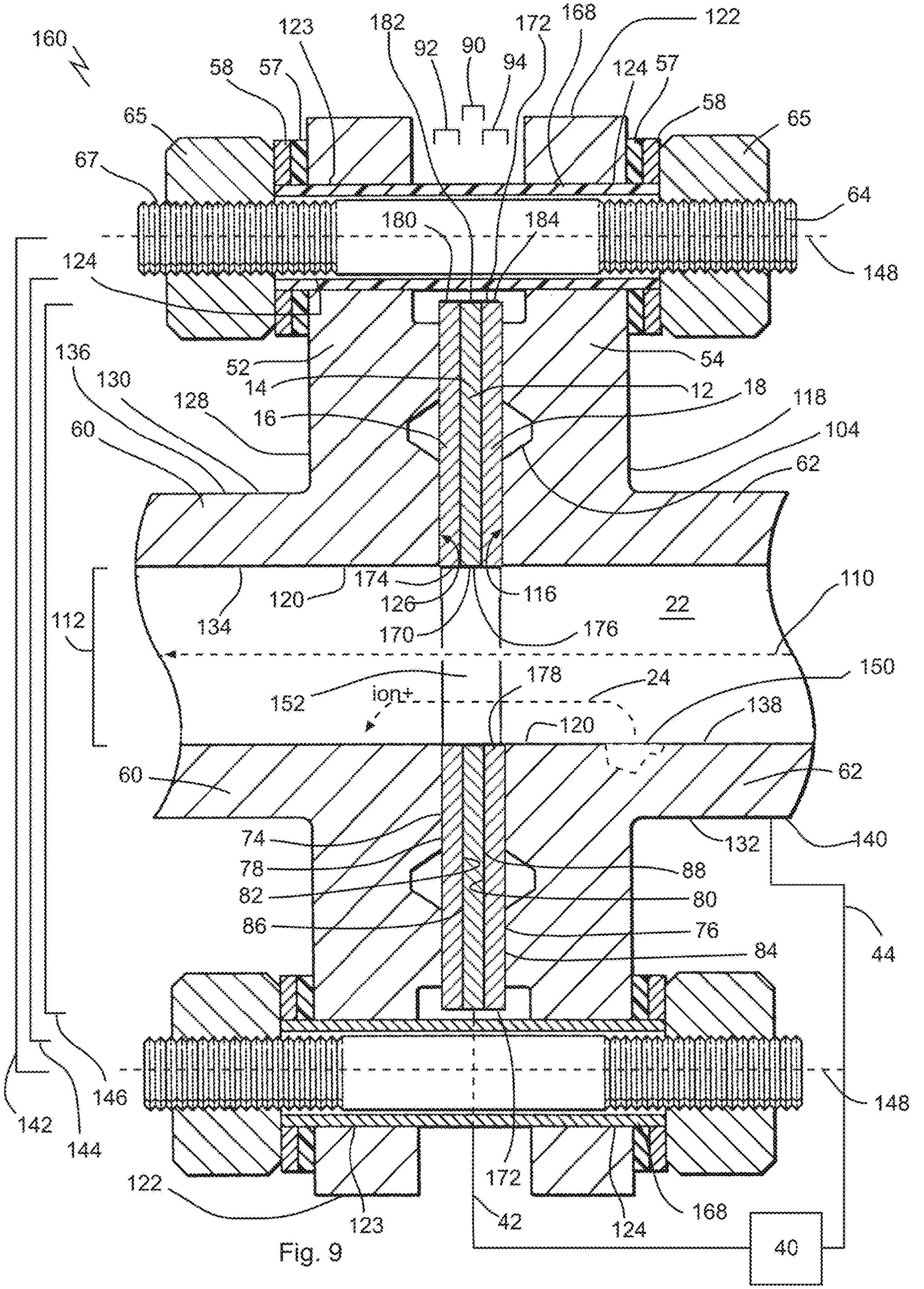
FIG. 9 is a cross-section detailed view of the pipe joint assembly of FIG. 6 installed in a pipeline system, illustrating the dielectric ring gasket between opposed pipe fittings.

Referring to FIGS. 6, 8, and 9, as above, in use the dielectric ring gasket 10 may be installed in a pipeline joint assembly 160, for example between a pair of ring flanges 52 and 54. The ring flanges 52, 54 may form part or the entirety of, respective adjacent first and second pipe fittings 60, 62. Each of the first and second pipe fittings 60 and 62 of pipeline joint assembly 160 may be formed of a pipe body, such as bodies 130, 132, and a ring flange, such as ring flanges 52, 54, respectively. The bodies 130, 132 may define inner cylindrical walls 134, 138, respectively, and exterior cylindrical walls 136, 140, respectively. The ring flanges 52, 54 may each define a plurality of openings, such as respective axial openings in an array of apertures 123, 124 (in ring flanges 52, 54, respectively). Each array of apertures 123, 124 may extend along respective axes 148 parallel to a pipeline joint axis 110. The apertures 123, 124 may define axis 148 that are spaced a diameter 142 apart about the axis 110 of the pipeline 22. An inner diameter 144 defined by an inner edge of the apertures 123, 124 may be wider than an outer diameter 146 of the gasket 10, to avoid conflict. Each aperture may be distributed at different angular positions about the axis 110, in most cases, with equal angular spacing between each aperture. The ring flanges 52, and 54 may be designed or selected such that each respective array of apertures 123, 124 align with one another to form respective fastener-receiving conduits to allow a fastener 64, such as a tie rod (shown) or bolt, to extend through and secure the opposed ring flanges 52, 54. The first ring flange 52 of the first pipe fitting 60 may align with the second ring flange 54 of the second pipe fitting 62. The first ring flange 52 and the second ring flange 54 may be mated via a fastener 64. The fastener 64 may extend between aligned aperture arrays 124 in the ring flanges 52, 54. A bolt sleeve or liner 168 may shroud and electrically isolate the fastener 64 from conductive contact with the flanges 52, 54. The first and second pipe fittings 60 and 62 may be electrically isolated by the dielectric ring gasket 10. In use, an electrical characteristic sensor may be present in the assembly 160. The electrical characteristic sensor may measure an electrical characteristic, such as one or more of electrical potential, current, voltage, resistance or other characteristics, whether qualitatively or quantitatively, and whether sensing one characteristic and calculating or otherwise outputting another characteristic. An electrical potential sensor, such as a voltmeter sensor 40, may be connected to the electrode 12 of the dielectric ring gasket 10, as will be described in more detail elsewhere. An internal diameter 112 of the assembly 160 may be consistent through the assembly 160, or may vary depending on the dimensions of the gasket 10 relative to the fittings.

Referring to FIGS. 1-4, and 9 the first dielectric ring portion 16 and the second dielectric ring portion 18 may have suitable features. The ring portions 16, 18 may individually define opposed dielectric pipeline flange-contacting faces 74, 84, respectively, of the gasket 10. Both portions 16, 18 may cooperate to define the inner circumferential edge 170 and the outer circumferential edge 172 of the gasket 10. Ring portion 16 may define a first and a second face 78 and 82, while ring portion 18 may define a first and a second face 80 and 84. The first dielectric pipeline flange-contacting face 74 of ring gasket 10 may be the first side face 78 of the first dielectric ring portion 16, which may be in contact with the first ring flange 52 of the first pipe fitting 60 in use. The second side face 82 of the first dielectric ring portion 16 may be in contact with the electrode 12, for example a first face 86 of the electrode 12. The second side face 82 of the first dielectric ring portion 16 may also be in contact with the second dielectric ring portion 18, such as a first side face 80 of the second dielectric ring portion 18. The second dielectric pipeline flange-contacting face 84 of ring gasket 10 may be the second side face 84 of the second dielectric ring portion 18, which may be in contact with the second ring flange 54 of the second pipe fitting 62 in use. The first side face 80 of the second dielectric ring portion 18 may be in contact with the electrode 12, for example a second face 88 of the electrode 12. The ring portions 16, 18 may each define inner circumferential edges 174, 178, and outer circumferential edges 180 and 184, respectively. The outer circumferential edge 172 of ring gasket 10 may be collectively defined by outer circumferential edges 180, and 184 of the first ring portion 16, and the second ring portion 18, respectively.

Figure 2:
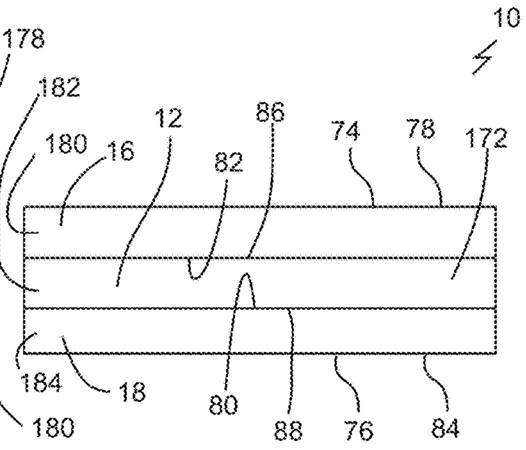
FIG. 2 is a side elevation of the pipeline joint assembly of FIG. 1.
Figure 3:
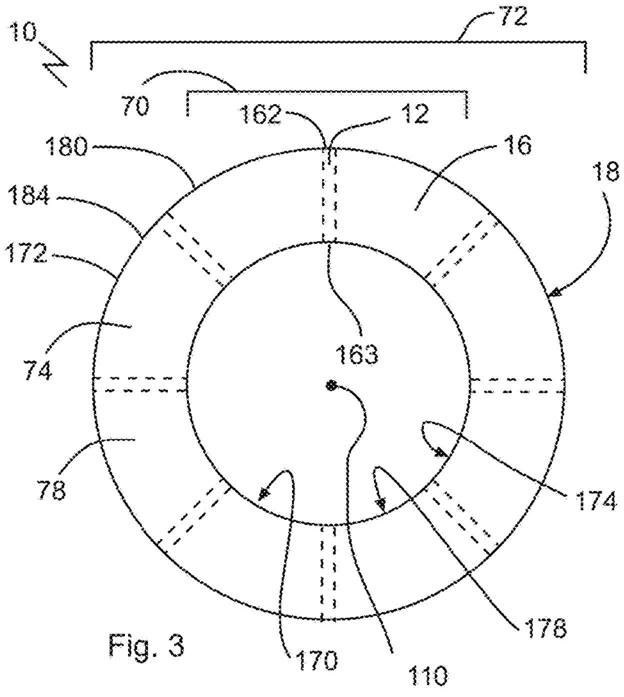
FIG. 3 is an end view of another embodiment of a dielectric ring gasket incorporating a plurality of electrode wires extending radially between inner and outer circumferential edges of the dielectric ring gasket.
Figure 4:
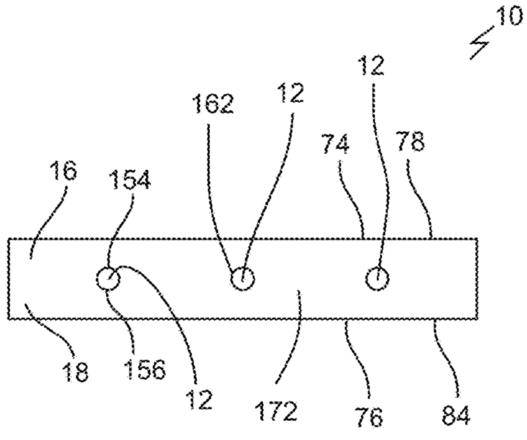
FIG. 4 is side elevation view of the dielectric ring gasket of FIG. 3.

Referring to FIGS. 1-4, the electrode 12 may have suitable properties. An electrode includes an electrical conductor configured to make contact with a conductive part of a circuit to create a circuit. Suitable metal-based electrode materials include stainless steel, silver, platinum, nickel, copper, gold, and titanium, as well as other types of materials. Some metals, such as silver, nickel, copper, gold, and titanium may be used as the base metal for an alloy, and addition of various metals may be modified to have specific functions, such as heat resistance, corrosion resistance, and pressure resistance. The electrode 12 may extend circumferentially around and define part of one or both inner circumferential edge 170 and outer circumferential edge 172 of the dielectric ring gasket 10. The electrode 12 between the two dielectric ring portions 16, 18 may extend from the inner circumferential edge 170 to the outer circumferential edge 172 of the dielectric ring gasket 10 to permit current transfer between edges 170 to 172. The electrode 12 may take various forms or have various shapes, such as a disc shape as illustrated in FIGS. 1 and 2, or as a wire (for example a shaft) as illustrated in FIGS. 3 and 4.

Referring to FIGS. 1, 2 and 9, the first and second dielectric ring portions 16 and 18 may comprise first and second dielectric discs that are connected together. A disc may be defined as a ring, which may define an axial through hole with an inner diameter 70, the ring having a relatively thin width, defining outer diameter 72, compared to a thickness 92 or 94, with planar faces 78, 80, 82, 84, although the faces may be ridges, slotted, or textured in some cases. The first and second dielectric discs may be axially stacked together and aligned as shown. In some cases, the electrode 12 may be inset within either or both the inner or outer circumferential edge 170, 172 of the gasket 10 to shield the electrode 12 from accidental contact with the ring flanges.

Referring to FIGS. 1, 2 and 9, as above, the electrode 12 may comprise a conductive disc between the first and second dielectric discs. The flat ring discs of the ring portions 16, 18 and electrode 12 may each define relatively thin thicknesses 92, 94, and 90, respectively, compared with the diameter 146 of the gasket 10, and may collectively define an axial thickness of the gasket 10. The gasket 10 may have a cylindrical or other suitable shape. A relatively thin width and cylindrical shape may allow the gasket 10 to fit within the pipeline joint assembly 160, such as between the pipe fittings 60, 62, in use.

Referring to FIGS. 3 and 4, the dielectric ring gasket 10 may have an electrode 12 that comprises an elongate member. The elongate member may extend radially through the dielectric ring gasket 10. In some cases, the elongate member comprises a wire, for example a pin or shaft. The elongate member may define a conductor termination point 162 on the outer circumferential edge 172. The elongate member may define a conductor termination point 163 (that could be considered an origination point) on the inner circumferential edge 170. The electrode 12 may extend circumferentially around the inner circumferential edge 170 (and/or in some cases, edge 172) of the dielectric ring gasket, for example as part of either a disc or elongate member embodiment of electrode 12. A plurality of wire electrodes 12 may be present in the gasket 10, for example embedded within the gasket 10 as illustrated, or otherwise passed through aperture or slots in the gasket 10. The plurality of electrodes may be arranged radially around the gasket 10, as shown in FIG. 3, for example a plurality of wires extended in radial directions at different angular positions about axis 110. The electrode 12 in any embodiment of the disclosure may be located at an intermediate position between and spaced from (insulated from) faces 74, 76 of the gasket 10, for example centrally located along flow axis 110.

Referring to FIG. 9, the pipeline joint assembly 160 may comprise a first pipe fitting 60 and a second pipe fitting 62 secured together with the ring gasket 10 therebetween in use. The first pipe fitting 60 may be formed with the first pipe body 130 and the first ring flange 52 connected together. The second pipe fitting 62 may be formed with the second pipe body 132 and the second ring flange 54 connected together. The ring flanges and pipe bodies may be connected by a suitable method, for example integrally formed together, for example by molding, welding, or machining. The first ring flange 52 may align with the second ring flange 54, for example to align each flange's respective array of apertures 123, 124. The first and second ring flanges 52, 54 may be mated via suitable fasteners 64, which may be extended between aligned aperture arrays 124 in the first and second ring flanges 52, 54. In the example shown, each fastener 64 comprises a tie rod 67 and a pair of nuts 65. The pipeline joint assembly 160 may have a fastener or plurality of fasteners 64 to adjoin one or more pipe fittings 60, 62 and one or more washers 57, 58 to secure and in some cases, electrically isolate one or more pipe fittings 60, 62 from one another. In the example shown washer 58 comprises a metal washer 57 and a dielectric washer 58. The fasteners 64 may extend between aligned aperture arrays 123, 124 in the ring flanges 52, 54. The fasteners 64 may be inserted within a dielectric fastener aperture liner 168, which may bridge apertures 123, 124, and through washers 57, 58, which may electrically isolate the adjacent ring flanges 52, 54 from electrical current shorts via fasteners 64. The washers 57 and/or 58 and/or sleeve line 168 may comprise dielectric material, such as epoxy, phenolic materials, polymeric materials, rubber, Nomex™, or other suitable materials, which may allow the liner 168 and washers 57, 58 to have insulative properties. The inner faces 100, 116 of the flanges 52, 54, respectively, may contact the gasket 10. The faces 100 and 116 may have indents 104 in some cases. The outer faces 102 and 118 of the flanges 52, 54, respectively, may define an exterior of the assembly 160.

Referring to FIGS. 6 and 9, the pipeline joint assembly 160 may incorporate or be structured to connect to or use, an electrical characteristic sensor 40. One example of a suitable electrical characteristic sensor is a voltmeter. A voltmeter includes an instrument that may be used to measure electric potential difference between two points in an electric circuit. Voltmeters may have high resistance, which may allow measurement of negligible current from the circuit. Analog voltmeters move a pointer across a scale in proportion to the voltage measured. Voltmeters may use amplifiers to measure voltages of microvolts or less. Digital voltmeters may provide a numerical display of voltage by use of an analog-to-digital converter. One of the design objectives of many voltmeters is to disturb the native circuit as little as possible, which may allow the instrument to draw a minimum current to operate. In use, the electrical characteristic sensor 40 may be connected to (directly or indirectly but in electrical contact with) the first and second pipe fittings 60, 62 of a pipeline joint assembly 160. A first probe 44 (for example a probe on the end of an electrical cable) may connect the electrical characteristic sensor 40 to one of the ring flanges, in this case, the ring flange 54 of the second pipe fitting 62. The probe 44 may read current measurements on the pipe fitting 62. The probe 44 may attach to either of ring flanges 52, 54 of either pipe fitting 60, 62. A second probe 42 (for example a probe on the end of an electrical cable) may be attached to the electrode 12, for example attached to the outer circumferential edge 182 of the electrode 12. The probes 42, 44 and sensor 40 may cooperate to detect, for example measure, current measurements through the electrode 12, and thus through the fluid in the pipeline 22. The inner circumferential edge 176 of the electrode 12 may be in contact with the pipeline 22, meaning that the current measurement on the electrode 12 may detect current flow inside the pipeline 22 reflective of internal corrosion of the pipeline 22.

Referring to FIG. 5, the pipeline joint assembly 160 may comprise a cathodic protection system 164. The cathodic protection system 164 may be in electrical connection with one of the first and second pipe fittings 60, 62, for example indirectly or directly. A cathodic protection system 164 may have a DC or other power supply 28 and one or more sacrificial anodes 26. The DC power supply 28 may operate as an external source of electrical power and may provide current to polarize the pipeline surface to be protected, such as the target CP structure 166, turning the structure 166 into a cathode. Cathodic polarization may slow or stop metal oxidation by introducing current to a surface, which may prevent corrosion of the target structure. The DC power supply 28 may have a positive cable probe 46 and a negative cable probe 48. The positive cable probe 46 may be connected to the anode 26, acting as a sacrificial material that corrodes in preference to the pipeline 22. The negative cable 48 of the DC power supply 28 may be connected to the target CP structure 166, such as the first pipe fitting 60 of pipeline 22. The anode 26 may function as a sacrificial metal, which would make the target CP structure 166 the cathode in the CP system 164, and may protect pipeline 22 structures, such as the first pipe fitting 60, from corrosion.

Referring to FIGS. 5, 6, and 9, the ring gasket 10 may be used in a suitable method to attempt to determine the presence or lack thereof of internal corrosion adjacent a pipeline joint assembly 160. The ring gasket 10 may be installed, for example as part of an isolation kit, between flanges 52, 54, and the flanges 52, 54 may be secured together and electrically isolated for example as above. The sensor 40 may be connected, for example between pipe body 132 and edge 182 of electrode 12, using probes 42 and 44, for example fixed and flexible probes as shown, respectively. In use, an electrical characteristic, such as an electrical potential, may be measured within the pipeline joint assembly 160, for example using the sensor 40. Measuring may thus involve measuring an electrical potential between a side, in the example shown the second side (second flange 54) of a joint assembly 160 in a pipeline 22 and an electrode 12 isolated within a dielectric ring gasket 10 that is between mated ring flanges 52, 54, of the joint assembly 160. The electrical potential may be measured using the electrical potential sensor 40.

Referring to FIGS. 5, 6, and 9, the method may comprise measuring or detecting an electrical resistance (qualitative or quantitative) across the first side (first flange 52) and a second side (second flange 54) of the joint assembly 160 using an insulation tester 36, such as the MC Miller Insulation Checker™ The insulation tester 36 may measure, for example detect, the presence of electrical resistance across the first side, such as the first side fitting 60, and a second side, such as the second side fitting 62, of the joint assembly 160, for example using cable probes 38. The insulation tester 36 may confirm the presence or absence of a resistive metallic short or path across the first and second flange 52, 54. If a current is measured by a current clamp such as a Swain meter 34, such current may indicate a possible corrosion reaction within the pipeline 22 on the side which current is returning from, in this case likely flange 54, however, it may fail to provide insight whether the current is flowing through an electrolyte or a resistive metallic short across the flanges 52, 54, for example from an isolation kit failure, such as via a breached or crushed fastener liner 168.

Referring to FIGS. 5, 6 and 9, the cathodic protection system 164 may involve measuring an electrical characteristic, such as an electrical potential difference between a first side, such as the first pipe fitting 60, of a joint assembly 160 in a pipeline 22 and the electrode 12 isolated within a dielectric ring gasket 10 that may be between mated ring flanges 52, 54 of the joint assembly 160. The method may involve measuring the electrical characteristic, such as electrical resistance or electrical potential difference (whether qualitatively or quantitatively) using sensor 40 while interrupting an offending power supply, such as the DC current supply 28. The DC power supply may be interrupted using a current interrupter, which may be pre-installed in a system, or may be a portable current interrupter, that may be connected to the DC current supply 28 to time the intervals of turning the power supply on and off. Interrupting the offending current from the cathodic protection system may facilitate measurement of the current potential difference between the internal metallic electrode 12 and the ring flange 52, 54 of interest. For example, referring to FIGS. 5 and 6, if the DC power supply 28 connected to the first pipe fitting 60 is turned off, the pipe flange of interest would be the second ring flange 54 of the second pipe fitting 62, as shown in FIG. 6, in which the positive probe 44 of the voltmeter may be connected to the second flange 54. If a potential difference is measured, it may indicate the presence of an electrolyte within the pipeline joint assembly 160. If no potential difference is measured, it may indicate the absence of electrolyte or interference within the pipeline joint assembly 160. The cathodic protection testing system may also connect the electrical potential sensor 40 to the second pipe fitting 62 of the joint assembly 160 in the pipeline 22. Comparing the potential difference of the first flange 52 and the electrode 12 with the current potential difference of the second flange 54 and the electrode 12 may suggest as to which flange may be at risk of internal corrosion. When a measurement is displayed, and is shifting more electropositive when the CP supply is interrupted, it may be the flange with the risk of internal corrosion.

Referring to FIGS. 5-7, the pipeline joint assembly 160 may be tested to determine what is happening across and inside the assembly 160. In one example, based on the measurements, the method involves determining whether there is a resistive metallic short across the first and second sides of the joint assembly, such as the first and second pipe fitting 60, 62, of the joint assembly 160. In some cases, it may be determined that there is solely a resistive metallic short across the first and second sides of the joint assembly, on conditions that there is decreased electrical resistance measured between the first and second sides of the joint assembly and there is no electrical potential measured between the second side and the electrode. A resistive metallic short may be present on conditions that the sensor or sensors 40 read zero or a steady or sporadic electrical potential, and the insulator tester 36 indicates a closed circuit. A floating voltage may occur when there is no electrical conductivity between two electrically isolated conductor structures, such as the first and second pipe fittings 60, 62 of the joint assembly 160. The voltmeter 40 may read a 400-600 mV electrical potential difference between the first and second pipe fittings 60, 62 due to the difference in CP power supply 28 between the two sides when the CP power supply 28 is interrupted, and may be caused by a resistive metallic short, for example from a liner 168 failure. An electrical potential difference may be measured across the two sides even when the supply 28 is off, due to the time it takes for the discharge of the current supplied through the pipeline 22 to discharge the structure. For example, referring to FIG. 5, when the DC power supply 28 is turned off or interrupted, the metallic current potential on the first pipe fitting 60 may be reduced, which would gradually create a lower and lower electrical potential difference, measured by the voltmeter 40, between the first and second flanges 52, 54, assuming the current on the second pipe flange 54 has a steady current flow. The voltmeter, on the other hand, may measure no electrical potential between the second pipe fitting 62 and the electrode 12 when the current is interrupted. In the same example, referring to FIG. 6, the flexible probe 44, which is connected to the second flange 54, may measure zero voltage, or a steady or sporadic voltage. This may indicate zero or negligible electrolytes present in the pipeline 22, as the electrode 12 in the dielectric ring gasket 10 was unable to complete the testing circuit.

Referring to FIGS. 5-7, in another example, based on the measurements, the method involves determining whether there is electrolyte present in the pipeline but none or nominal internal corrosion of the second side of the assembly 160. Such a situation may exist on condition that there is no shifting electrical potential measured between the second side of the pipeline and the electrode but there is a non-zero, steady (non-shifting) electrical potential measured between the second side and the electrode. Such a situation may exist on conditions that the voltmeter or sensor 40 measures a steady (non-shifting) potential. The detection of electrolytes may indicate that stray current 25 or ICT may be possible in the pipeline 22, if a sufficient voltage is maintained across the assembly 160. Electrolytes may be present even when there is none or nominal internal corrosion of the second side, such as the second pipe fitting 62, of the pipeline assembly 160. The insulation tester 36 may in such a scenario measure no electrical short between the first and second pipe fittings 60, 62, due to a functional isolation kit. Assuming that there is no resistive shorting occurring directly between the flanges themselves, the insulation tester 36 may nonetheless show the presence of shorting due to the electrolyte in the fluid if sufficient electrolyte is present. The voltmeter or sensor 40, on the other hand, may measure steady electrical potential between the second side, such as the second pipe fitting 62, and the electrode 12.

Referring to FIGS. 5-7, in another example, based on the measurements, the method involves determining whether there is internal corrosion occurring on the second side of the pipeline joint assembly 160. Assembly 160 may be experiencing internal corrosion, on conditions that the voltmeter or sensor 40 measures a shifting electrical potential between one side of the joint and the electrode 12. Assuming that there is no resistive shorting occurring directly between the flanges themselves, the insulation tester 36 may nonetheless show the presence of shorting due to the electrolyte in the fluid if sufficient electrolyte is present. The side of the pipe that shifts more electronegative when the current is interrupted (e.g. −50 mV ON to −100 mV OFF) may be the side that may be corroding, since current actively discharging from a metal surface into an electrolyte will cause it to be more electropositive than normal. Referring to FIG. 7, any current 24 flow from corrosion (metal ions or flow of positive ions-since the electrons leave the surface of the metal through metallic paths only and cannot travel through an electrolyte on their own), for example at point 150 in wall 138 may electrolytically flow through pipeline fluid between point 150 to electrode 12, where such would be measured by sensor 40. The second pipe joint fitting 62 may experience oxidation during the current transition, which may allow the inner cylindrical wall 140 of the second pipe joint fitting 62 to have a more electropositive structure, which may enlarge the internal corrosion point 150 over time. If insulation tester 36 indicated that there may be a resistive metallic short across the flanges 52, 54, the use of sensor 40 may clarify whether the result is a short across flanges 52, 54, for example from a broken liner 168, or whether there is ICT occurring. A small differential, at about 50 mV, which may be the difference between the on and off potential of the DC power supply 28, may produce a 2-mV shift, or 200 mV shift, or a shift of some other value. Such shift may be proportional in value to the amount of current flowing through the electrolyte, and thus the rate of corrosion. Current may be due to an active corrosion process, in which, the electrolytes move in the reaction, and may be detected using high resistance voltmeter. If ICT is not present, there may be no change in measurement, and a passive measure of voltage from the voltmeter may be observed.

Referring to FIGS. 5 and 6, other variations of the method may be used. A current clamp and isolation kit tester may be used. A current clamp such as a Swain meter 34, may determine if any conductive current 24 is bypassing the insulator, such as the dielectric ring gasket 10. An insulation kit tester 36 may be used to confirm if the insulation kit has wholly or partially failed. If current 24 is bypassing between the first and second pipe fittings 60, 62, and the insulation kit, there may be a metallic short, or electrolytic short, but such may not be verified without internal inspection, outside of the methods disclosed herein. In some cases, information may be gathered from the history of the pipelines 22, from speaking with owners and verifying the contents of pipe, to determine if an electrolytic fluid would be likely in the pipe of interest. The prior methods of using meter 34 and tester 36 may measure the current 24 through the pipeline 22, as shown in FIG. 5, but the test may be unable to identify whether the current path bridging the electrical insulation kit is through an electrolyte or metallic pathway. By contrast, the use of sensor 40 and gasket 10 may permit such discernment.

Referring to FIG. 10, a flow chart is illustrated as one non-limiting example of a method of assessing and measuring internal corrosion on a pipeline. The method may be carried out using one or more computer processors to carry out steps, such as using a processor or computer 280, which may output to a display 260. Information, such as sensor data, may be provided to the computer 280 via one or more of sensor or sensors 40, or an information input device such as a keyboard (not shown). The method of FIG. 10 will now be stepped through with reference to parts shown in FIGS. 5-6. The method shown may be considered to be general guidelines for testing the status of ICT where the isolation/insulation kit has a gasket 10.

In a stage 200, the method begins. In a stage 202, the method may involve interrupting the CP system and locating the isolation kit with the electrode gasket (EG refers to the electrode 12). In a stage 204, the voltage between the electrode 12 and both sides of the pipeline joint assembly 160 is measured. In a decision stage 206, the system considers whether the voltages are zero. Unless specified otherwise, all voltages and currents measured for the purpose of this testing may be the change in voltage and current due to the interrupting cathodic protection current ($\Delta V$ & $\Delta I$). Predicted probable outcomes (i.e., suspected, likely, maybe, and others) are general and may not be accurate in every case due to the sensitivity of the instruments used and nonideal testing conditions.

In a stage 208, if the answer for stage 206 is yes, the system may conclude that no ICT is suspected. In a stage 210, the voltage may be measured between the electrode 12 and the sides of the assembly 160, measuring steady values without interruption of the CP source (DC power supply 28 for example). In a stage 212, the system considers whether the voltages are zero. If yes to stage 212, the system in a stage 214 may conclude that there is no electrolyte suspected to be bridging the gasket 10. An insulation checker may indicate a short if a metallic short is present, leading to termination of the method in stage 218. If no to stage 212, then the system may in a stage 216 conclude there is electrolyte suspected of bridging the gasket 10, but with no ICT occurring. ICT may, however, be a future concern in this situation, for example if the voltage differential between the two flanges increased. The system may then terminate the method in stage 218.

In a stage 220, if no in stage 206, the system may determine that ICT is suspected. In a decision stage 222, the system may consider whether additional details or insights are required. In one example, the system may prompt the user to confirm whether such additional information is required. The system may also make such a determination based on the preferences of the user (for example based on settings or form answers taken at another point in the process) or other factors in a given situation. If the answer is no in stage 222, then in a stage 224, the system may note the presence of ICT and address the situation accordingly based on other risk factors. The system may terminate the method in a stage 226.

If the answer is yes to stage 222, then in a stage 228, the system may consider whether there is a means to measure DC current, such as via a Swain meter. If yes to stage 228, then in a stage 232, the system may consider whether a resistance meter is available, for example one that uses low frequency alternating current (AC). One example of equipment a cathodic protection technician may use is a ground resistance tester such as those used for soil resistivity testing, which may go below 120 Hz, although different ranges may be used, including ones that test higher or lower. A goal of using an AC unit may be to approximate DC resistance as close as practicable. Some units permit testing at multiple frequencies, and a user may take multiple frequency measurements to extrapolate values to a lower Hz, such as at or near 0 Hz. If yes in stage 232, then the system may in a stage 234 carry out an ICT severity determining method as detailed in the example below. In a stage 236, the user may consider the results of testing and severity of ICT and address the ICT accordingly based on other risk factors. In a stage 238, the method may terminate.

If the answer to stage 228 is no, then in a stage 230 the system may consider whether an insulation checker is available, for example an MIC sensor, which is a Miller™ Insulation Checker). An insulation checker or tester may measure the relative quality of the insulation resistance. An insulation checker may qualitatively measure the electrical resistance of insulation by applying a voltage between two locations, and measuring the resultant current flow. In short, an insulation checker may apply a voltage (typically high frequency AC voltage to produce a more local effect, while negating the effects of the larger pipeline circuit) across a dielectric, measuring the amount of current flowing through that dielectric, and then determining a resistance characteristic. If the answer is no in stage 230, then in a stage 224, the system may note the presence of ICT and address the situation accordingly based on other risk factors. The system may terminate the method in a stage 226. If the answer is no to stage 232, the system may in a stage 256 measure DC current across the flange. The system may make various qualitative and quantitative assumptions about the ICT. In a stage 258 the system may use Faraday's law to calculate maximum severity (for example worst case scenario) of ICT assuming that all current is being transferred through the electrolyte. In a stage 260, the system may consider whether an insulation checker is available, such as an MIC or equivalent. if no, the system may terminate the method.

If yes to stages 230 or 260, the system may in a stage 240 test the isolation kit with the insulation checker. In a stage 242, the system may consider whether a direct short is indicated. If yes to stage 242, then in a stage 248, the system may conclude that ICT may be minimal or negligible, with the majority of DC current (if measured) being likely through a metallic short. In such a case, the user may in a stage 252 note the presence of ICT and insulation checker results and address the situation accordingly based on other risk factors, terminating the method in a stage 254. If the stage 242 result is no, then the system may consider in a decision stage 244 whether a partial or resistive short is indicated. If no in stage 244, then in a stage 246 the system may conclude that ICT may be significant. The majority of DC current (if measured) may likely be through an electrolytic path. In this case, higher electrolytic resistances may be too high depending on insulation checker instrument sensitivity. Immediate action may need to be taken to rectify the suspected ICT to prevent further damage to the assembly 160 and potentially a leak in the pipeline itself. If yes in stage 244, the system in stage 250 may conclude that ICT may be significant-DC current (if measured) being a wide range of ratios of electrolytic to metallic current.

Method for using an Internal Current Monitoring (ICM) Gasket to determine instantaneous rate of wall loss within a flange.

In the following discussion, an example ICT severity determining method is illustrated.

Measurements:

a. Measure current bypassing flange using DC Current Clamp (e.g., Swain Meter). This is $I_t$
b. Measure DC voltage of Flange A relative to Gasket Electrode (GE). This is $V_a$
c. Measure DC voltage of Flange B relative to GE. This is $V_b$
d. Measure DC voltage of Flange A relative to Flange B. This is $V_c$.

e. Measure low frequency (<120 Hz) AC impedance of Flange A relative to GE. This is $Z_a$.
f. Measure low frequency (<120 Hz) AC impedance of Flange B relative to GE. This is $Z_b$.
g. Measure low frequency (<120 Hz) AC impedance of Flange A relative to Flange B. This is $Z_c$.

Notes: DC resistance may be used if compensation is made to minimize DC measuring error where there is an existing DC voltage present. AC frequency must be low to more closely resemble the actual DC resistance. All voltage and current measurements are the change in voltage or current based on the interrupted cathodic protection current source.

Calculations:

a. Calculate the isolated resistance between Flange A relative to GE (Ra) using the following equation*:

$$R_a = \frac{Z_a^2 - 2Z_a(Z_b + Z_c) + (Z_b - Z_c)^2}{2(Z_a - Z_b - Z_c)}$$

b. Calculate the isolated resistance between Flange B relative to GE (Rb) using the following equation*:

$$R_b = -\frac{Z_a^2 - 2Z_a(Z_b + Z_c) + (Z_b - Z_c)^2}{2(Z_a - Z_b + Z_c)}$$

c. Calculate the isolated resistance between Flange A relative to Flange B (Rb) using the following equation*:

$$R_c = -\frac{Z_a^2 - 2Z_a(Z_b + Z_c) + (Z_b - Z_c)^2}{2(Z_a + Z_b - Z_c)}$$

i. *Where:
ii. a) $Z_a \neq Z_b + Z_c$
iii. b) $Z_b \neq Z_a + Z_c$
iv. c) $Z_c \neq Z_a + Z_b$
v. d) $Z_aZ_bZ_c\left(Z_a^2 - 2Z_a(Z_b + Z_c) + (Z_b - Z_c)^2\right) \neq 0$ d. Calculate current traveling through each resistance using the following equations:

$$I_a = \frac{V_a}{R_a}$$

$$I_b = \frac{V_b}{R_b}$$

$$I_c = \frac{V_c}{R_c}$$

i. $I_a$ Represents the current traveling through the electrolyte between Flange A and the GE.
ii. $I_b$ Represents the current traveling through the electrolyte between Flange B and the GE.
iii. $I_c$ Represents the current traveling through both the combined parallel paths between the two structures through the earth as well as any resistive metallic short in the event of a failed isolation kit.
iv. In theory, $I_a$ and $I_b$ will be the same magnitude, with any apparent variation being a result of measurement error and rounding. The flange at risk of corrosion is the one where the current is moving toward the GE, or discharging from the internal pipe wall.

e. Calculate the current travelling through a metallic path through the failed isolation kit using the following equation:

$$I_{ik} = I_t - I_a - I_b$$

f. Calculate the current travelling through the soil across the two structures using the following equation:

$$I_s = I_c - I_{ik}$$

g. Determining $I_s$ is not required for determining internal current transfer, it is only shown here to draw attention to why $I_t \neq I_a + I_b + I_c$ (unless there is no soil path in the circuit, such as if the structure associated with Flange B is not grounded). $I_s$ may also include current from any other unknown parallel paths.

h. Calculate the predicted rate of loss on the internal wall of the pipe at risk using Faraday's Law.

$$m = \frac{MtI_b}{nF}$$

i. Where:
i. m=mass lost from within the pipe wall (g)
ii. n=number of charges transferred in reaction
iii. M=atomic weight of metal corroding (g)
iv. F=Faraday's constant (approx. 96,500 coulombs)
v. $I_b$=corrosion current (A)
vi. t=time(s) (31,536,000 s/year)

TABLE 1

Spreadsheet used to calculate ICT using sample data

| Circuit Resistor values (unknown in field) | User Input Individual Resistance Values (used to calculated the predicted measured value for the described system) | Calculated Resistances using unrounded field data (calculated in excel) | Calculated Resistances using Rounded Field Data |
|---|---|---|---|
| Ra | 5000 | 5000 | 4999.90 |
| Rb | 5000 | 5000 | 4999.90 |
| Rc | 5 | 5 | 5.00 |

| Measured Resistance Terms | Simulated measured resistances based on Set Resistance values | Rounded Calculated measured resistances |
|---|---|---|
| Za | 2501.249375 | 2501.2 |
| Zb | 2501.249375 | 2501.2 |
| Zc | 4.997501249 | 5 |

TABLE 1-continued

| Spreadsheet used to calculate ICT using sample data | | |
|---|---|---|
| Constraints | Constraint Test Using Theoretical Measurement | Constraint Test Using Rounded Theoretical Measurement Values (more realistic) |
| Za ≠ Zb + Zc | Pass | Pass |
| Za + Zc ≠ Zb | Pass | Pass |
| Za + Zb ≠ Zc | Pass | Pass |
| ZaZbZc(Za^2 − 2Za(Zb + Zc) + (Zb − Zc)^2) ≠ 0 | Pass | Pass |

Field measured resistances should use AC resistance tester to negate the DC bias present in the system.
Since the measured values are reliant on the actual resistances x, y and z, the formulae should always work in theory, however, measurement error and rounding may cause a failure of the constraints.
If the measured values in the field do not pass the constraint test using the values to which they have significant digits for, some mild adjustment to the measured data may be required when entering, though this should be quite rare, if ever realistically required.

TABLE 2

| Formulas for each cell in the spreadsheet of Table 1 | | | |
|---|---|---|---|
| Circuit Resistor values (unknown in field) | User Input Individual Resistance Values (used to calculated the predicted measured value for the described system) | Calculated Resistances using unrounded field data (calculated in excel) | Calculated Resistances using Rounded Field Data |
| Ra | 5000 | = (B6^2 − 2*B6*(B7 + B8) + (B7 − B8)^2)/(2*(B6 − B7 − B8)) | = (D6^2 − 2*D6*(D7 + D8) + (D7 − D8)^2)/(2*(D6 − D7 − D8)) |
| Rb | 5000 | = − (B6^2 − 2*B6*(B7 + B8) + (B7 − B8)^2)/(2*(B6 − B7 + B8)) | = − (D6^2 − 2*D6*(D7 + D8) + (D7 − D8)^2)/(2*(D6 − D7 + D8)) |
| Rc | 5 | = − (B6^2 − 2*B6*(B7 + B8) + (B7 − B8)^2)/(2*(B6 + B7 − B8)) | = − (D6^2 − 2*D6*(D7 + D8) + (D7 − D8)^2)/(2*(D6 + D7 − D8)) |

| Measured Resistance Terms | Simulated measured resistances based on Set Resistance values | Rounded Calculated measured resistances |
|---|---|---|
| Za | = 1/(1/B2 + 1/(B3 + B4)) | = ROUND(B6, 1) |
| Zb | = 1/(1/B3 + 1/(B2 + B4)) | = ROUND(B7, 1) |
| Zc | = 1/(1/B4 + 1/(B2 + B3)) | = ROUND(B8, 1) |

| Constraints | Constraint Test Using Theoretical Measurement | Constraint Test Using Rounded Theoretical Measurement Values (more realistic) |
|---|---|---|
| Za ≠ Zb + Zc | = IF(B6 − B7 − B8 = 0, "Fail", "Pass") | = IF(D6 − D7 − D8 = 0, "Fail", "Pass") |
| Za + Zc ≠ Zb | = IF(B7 − B6 − B8 = 0, "Fail", "Pass") | = IF(D7 − D6 − D8 = 0, "Fail", "Pass") |
| Za + Zb ≠ Zc | = IF(B8 − B7 − B6 = 0, "Fail", "Pass") | = IF(D8 − D7 − D6 = 0, "Fail", "Pass") |
| ZaZbZc(Za^2 − 2Za(Zb + Zc) + (Zb − Zc)^2) ≠ 0 | = IF(B6*B7*B8*(B6^2 − 2*(B7 + B8) + (B7 − B8)^2) = 0, "Fail", "Pass") | = IF(D6*D7*D8*(D6^2 − 2*(D7 + D8) + (D7 − D8)^2) = 0, "Fail", "Pass") |

Field measured resistances should use AC resistance tester to negate the DC bias present in the system.

Since the measured values are reliant on the actual resistances x, y and z, the formulae should always work in theory, however, measurement error and rounding may cause a failure of the constraints.

If the measured values in the field do not pass the constraint test using the values to which they have significant digits for, some mild adjustment to the measured data may be required when entering, though this should be quite rare, if ever realistically required.

TABLE 3 sample values

| Example System Description | Electrolyte present between first and second flanges (52 and 54): | Direct Metallic short between first and second flanges (52 and 54): | Resistive metallic short between first and second flanges (52 and 54): | Voltmeter 40 Measurement Electrode 12 (negative lead 42) to Flange 52 (positive lead 44) | Voltmeter 40 Measurement Electrode 12 (negative lead 42) to Flange 54 (positive lead 44) | Expected MC Miller Insulation Tester 36 result between flange 52 and flange 54 | Swain Meter Current Clamp Measurement around pipe at either flange 52 or 54 side. | Conclusion Based on Testing Data | Conclusion if Electrode 12 was not available |
|---|---|---|---|---|---|---|---|---|---|
| Target CP Structure 166 resistance to ground: 0.2 | No | No | No | 0 mV | 0 V | Solid green light | 0 mA | No electrolyte present No ICT present | Electrolyte likely not present No ICT present |
| Ohms Foreign Structure resistance to ground: 0.1 Ohms CP Rectifier 28 Voltage Output: 10 V Anode 26 Resistance to Ground: 2 Ohms Voltmeter 40 Input Impedance: | No | No | Yes | 0 mV | 0 V | Blinking red light | 18.1 mA | No electrolyte present No ICT present May be flagged for isolation kit repair | Electrolyte presence unknown ICT Possible inside of flange 54 unknown if resistive metallic short or electrolytic ICT May be flagged for isolation kit repair |
| 10M Ohms Resistance through electrolyte (if present) between electrode 12 and both flanges 52 and 54: 200 Ohm Gasket 12 to electrolyte (if present) resistance: | No | Yes | No | 0 mV | 0 V | Solid red light | 3115.3 mA | No electrolyte present No ICT present Should be flagged for isolation kit repair | Electrolyte presence unknown ICT possible inside of flange 54 but unlikely due to direct metallic short Should be flagged for isolation kit repair |
| 2000 Ohms Resisted metallic short (if present) resistance: 50 Ohms Direct Metallic short (if present) resistance (0.01 Ohms) Negligeable Rectifier Cable 46 | Yes | No | No | −454 mV | 454 mV | Blinking red light | 2.27 mA | Electrolyte present ICT present inside of Flange 54 severity may be determined using attached method. | Electrolyte presence unknown ICT Possible inside of flange 54 unknown if resistive metallic short or electrolytic ICT May be flagged for isolation kit repair |
| and 48 resistance (Values used only for calculating possible/ expected results for hypothetical scenario) | Yes | No | Yes | −452 mV | 452 mV | Blinking red light | 20.3 mA | Electrolyte present ICT present inside of Flange 54 severity may be determined using attached method. | Electrolyte presence unknown ICT Possible inside of flange 54 unknown if resistive metallic short or electrolytic ICT May be flagged for isolation kit repair |

TABLE 3-continued

| sample values | | | | | | | | | |
|---|---|---|---|---|---|---|---|---|---|
| Example System Description | Electrolyte present between first and second flanges (52 and 54): | Direct Metallic short between first and second flanges (52 and 54): | Resistive metallic short between first and second flanges (52 and 54): | Voltmeter 40 Measurement Electrode 12 (negative lead 42) to Flange 52 (positive lead 44) | Voltmeter 40 Measurement Electrode 12 (negative lead 42) to Flange 54 (positive lead 44) | Expected MC Miller Insulation Tester 36 result between flange 52 and flange 54 | Swain Meter Current Clamp Measurement around pipe at either flange 52 or 54 side. | Conclusion Based on Testing Data | Conclusion if Electrode 12 was not available |
| | Yes | Yes | No | −15.4 mV | 15.4 mV | Solid red light | 3115.3 mA | Electrolyte present, minor ICT possible but likely not significant due to the direct metallic short severity may be determined using attached method. | ICT highly unlikely, unknown if electrolyte present, should be flagged for isolation kit repair. |

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A pipeline joint assembly comprising:

first and second pipe fittings each formed with a pipe body and a ring flange, with the ring flanges aligned, and mated via fasteners extended between aligned aperture arrays in the ring flanges;

a dielectric ring gasket between the ring flanges and having:

first and second dielectric ring portions; and an electrode isolated between the first and second dielectric ring portions and extended from an inner circumferential edge and an outer circumferential edge of the dielectric ring gasket; and an electrical characteristic sensor connected to the electrode.

2. The pipeline joint assembly of claim 1 in which the first and second dielectric ring portions comprise first and second dielectric discs that are connected together.

3. The pipeline joint assembly of claim 2 in which the electrode comprises a conductive disc between the first and second dielectric discs.

4. The pipeline joint assembly of claim 1 in which the electrode comprises an elongate member.

5. The pipeline joint assembly of claim 4 in which the elongate member extends radially through the dielectric ring gasket.

6. The pipeline joint assembly of claim 4 in which the elongate member comprises a wire.

7. The pipeline joint assembly of claim 4 in which the elongate member defines a conductor termination point on the outer circumferential edge of the dielectric ring gasket.

8. The pipeline joint assembly of claim 1 in which the electrode extends circumferentially around the inner circumferential edge of the dielectric ring gasket.

9. The pipeline joint assembly of claim 1 in which each fastener is inserted within a dielectric fastener liner to electrically isolate the adjacent ring flanges.

10. The pipeline joint assembly of claim 1 in which the electrode comprises a plurality of electrodes.

11. The pipeline joint assembly of claim 1 in which the electrical characteristic sensor is connected to one of the first and second pipe fittings.

12. The pipeline joint assembly of claim 1 in which the electrical characteristic sensor comprises an electrical resistance sensor.

13. The pipeline joint assembly of claim 1 further comprising a cathodic protection system in electrical connection with one of the first and second pipe fittings.

14. A method comprising measuring an electrical characteristic between a side of a joint assembly in a pipeline and an electrode isolated within a dielectric ring gasket that is between mated ring flanges of the joint assembly; and in which:

a cathodic protection system is connected to a first side of the joint assembly in the pipeline; and the electrical characteristic is measured between a second side of the joint assembly and the electrode.

15. The method of claim 14 in which measuring is done while interrupting a power supply of the cathodic protection system.

16. The method of claim 14 further comprising using the electrical characteristic sensor to measure the electrical resistance.

17. The method of claim 14 further comprising measuring an electrical characteristic across the first side and a second side of the joint assembly.

18. The method of claim 17 further comprising, based on the measurements, determining whether:

there is solely a resistive metallic short across the first and second sides of the joint assembly, on conditions that there is decreased electrical resistance measured between the first and second sides of the joint assembly and there is no shifting or non-shifting electrical potential measured between the second side and the electrode; or there is electrolyte present in the pipeline but none or nominal internal corrosion of the second side, on conditions that there is no shifting electrical potential measured between the second side of the pipeline and the electrode but there is a non-zero, steady (non-shifting) electrical potential measured between the second side and the electrode;

there is internal corrosion occurring on the second side of the pipeline, on conditions that there is a shifting electrical potential measured between the second side and the electrode.

19. The method of claim 18 further comprising outputting the determined value on a display.

20. The method of claim 14 further comprising determining a rate of mass loss of internal corrosion occurring on the second side of the pipeline.

21. A method comprising measuring an electrical characteristic between a side of a joint assembly in a pipeline and an electrode isolated within a dielectric ring gasket that is between mated ring flanges of the joint assembly; and measuring an electrical characteristic across the first side and a second side of the joint assembly.

22. The method of claim 21 in which:

a cathodic protection system is connected to a first side of the joint assembly in the pipeline; and the electrical characteristic is measured between a second side of the joint assembly and the electrode.

23. The method of claim 22 in which measuring is done while interrupting a power supply of the cathodic protection system.

24. The method of claim 21 further comprising using the electrical characteristic sensor to measure the electrical resistance.

25. The method of claim 21 further comprising, based on the measurements, determining whether:

there is solely a resistive metallic short across the first and second sides of the joint assembly, on conditions that there is decreased electrical resistance measured between the first and second sides of the joint assembly and there is no shifting or non-shifting electrical potential measured between the second side and the electrode; or there is electrolyte present in the pipeline but none or nominal internal corrosion of the second side, on conditions that there is no shifting electrical potential measured between the second side of the pipeline and the electrode but there is a non-zero, steady (non-shifting) electrical potential measured between the second side and the electrode;

there is internal corrosion occurring on the second side of the pipeline, on conditions that there is a shifting electrical potential measured between the second side and the electrode.

26. The method of claim 25 further comprising outputting the determined value on a display.

27. The method of claim 21 further comprising determining a rate of mass loss of internal corrosion occurring on the second side of the pipeline.

* * * * *